United States Patent
Girodot et al.

(10) Patent No.: US 11,427,161 B2
(45) Date of Patent: Aug. 30, 2022

(54) DRIVE ARM FOR DRIVING A WIPER BLADE INTENDED FOR A MOTOR VEHICLE

(71) Applicant: Valeo Systèmes d'Essuyage, Le Mesnil Saint Denis (FR)

(72) Inventors: Cyrille Girodot, Issoire (FR); Nicolas Kuchly, Issoire (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 0 days.

(21) Appl. No.: 17/258,595

(22) PCT Filed: Jun. 10, 2019

(86) PCT No.: PCT/EP2019/065085
§ 371 (c)(1),
(2) Date: Jan. 7, 2021

(87) PCT Pub. No.: WO2020/011460
PCT Pub. Date: Jan. 16, 2020

(65) Prior Publication Data
US 2021/0162953 A1    Jun. 3, 2021

(30) Foreign Application Priority Data
Jul. 9, 2018 (FR) .................. 1856272

(51) Int. Cl.
*B60S 1/34* (2006.01)
*B60S 1/38* (2006.01)

(52) U.S. Cl.
CPC ........... *B60S 1/3468* (2013.01); *B60S 1/345* (2013.01); *B60S 1/347* (2013.01); *B60S 1/3465* (2013.01); *B60S 2001/3836* (2013.01)

(58) Field of Classification Search
CPC ........ B60S 1/3465; B60S 1/3468; B60S 1/34; B60S 1/345; B60S 1/347
USPC .................................................. 15/250.15
See application file for complete search history.

(56) References Cited

U.S. PATENT DOCUMENTS

2008/0155777 A1    7/2008  Stull

FOREIGN PATENT DOCUMENTS

| DE | 1919412 A1 | 10/1970 | |
| DE | 4029404 A1 * | 3/1992 | ............... B60S 1/34 |
| DE | 102015221910 A1 | 5/2017 | |

OTHER PUBLICATIONS

International Search Report and Written Opinion in corresponding International Application No. PCT/EP2019/065085, dated Jul. 19, 2019 (9 pages).

* cited by examiner

Primary Examiner — Katina N. Henson
(74) Attorney, Agent, or Firm — Osha Bergman Watanabe & Burton LLP

(57) ABSTRACT

The invention relates to a drive arm for driving a wiper blade intended for a motor vehicle, the drive arm extending in a longitudinal direction (X), the drive arm comprising at least one first attachment means (224) for a first end of an elastic return device and at least one second attachment means (234) for the first end of the elastic return device, characterized in that a first distance (d1) measured parallel to the longitudinal direction (X) between the first attachment means (224) and the second attachment means (234) is not zero.

8 Claims, 3 Drawing Sheets

DRIVE ARM FOR DRIVING A WIPER BLADE INTENDED FOR A MOTOR VEHICLE

The present invention relates to the field of wiper systems for wiping glazed surfaces, and more particularly to wiper systems intended for the glazed surfaces of motor vehicles.

Motor vehicles are commonly equipped with a wiper system to ensure cleaning of the glazed surfaces, such as the windshield or the rear window, and to prevent the driver's view of his or her environment from being disturbed. These wiper systems conventionally comprise a drive arm performing an angular back and forth movement and comprise elongated wiper blades, themselves carrying wiper rubbers which rub against the glazed surface and remove the water and/or dirt present on this glazed surface so as to sweep them out of the driver's field of vision.

Such wiper systems generally comprise at least one spring configured to press the wiper blade, and therefore the wiper rubber carried by this wiper blade, against the glazed surface concerned, so as to ensure that the wiper rubber exerts a sufficient bearing force to perform the function of sweeping the glazed surface to be wiped. The force to be applied to these wiper blades in order to press them against the glazed surface varies depending on a length of the wiper blade, the type of wiper rubber and the force required to press the wiper blade onto the curvature of the glazed surface.

Automobile manufacturers must therefore design, test and manufacture a multitude of wiper systems corresponding to the multitude of glazed surface models, in order to meet customer demands. The present invention falls within this context and proposes a system that is simple and inexpensive to implement and that makes it possible to standardize, at least in part, these wiper systems, with the result that the manufacturing costs of the latter are reduced.

An object of the present invention thus relates to a drive arm for driving a wiper blade intended for a motor vehicle, the drive arm extending along a longitudinal direction, the drive arm comprising at least one first attachment means for a first end of an elastic return device and at least one second attachment means for the first end of the elastic return device. According to the invention, a first distance measured parallel to the longitudinal direction between the first attachment means and the second attachment means is non-zero. In other words, it will be understood that the first attachment means and the second attachment means are offset relative to one another along the longitudinal direction.

It will he understood that the first end of the elastic return device is thus intended to be fixed, alternatively, on the first attachment means or on the second attachment means. Once stretched, this elastic return device tends to assume an initial position, also called the rest position, then generating an elastic return force making it possible to generate a proportional force at one end of the drive arm to press the wiper blade carried by this drive arm against a glazed surface of the vehicle concerned. It will then be understood that by offsetting the first attachment means relative to the second attachment means, the present invention makes it possible to vary the elongation of this elastic return device, thus making it possible to vary this elastic return force exerted by this elastic return device and therefore to vary the proportional force generated at the end of the drive arm mentioned above that allows the wiper blade to he pressed. Advantageously, the elongation of the elastic return device is directly proportional to the elastic return force that it exerts.

According to one feature of the present invention, the drive arm comprises at least one third attachment means for the first end of the elastic return device, a second distance measured between the first attachment means and this third attachment means being non-zero and a third distance measured between the second attachment means and the third attachment means being non-zero. As previously, it will therefore be understood that the first attachment means, the second attachment means and the third attachment means are offset relative to one another along the longitudinal direction. In other words, the elastic return device arranged in the drive arm according to the invention is then configured to exert three different elastic return forces, in absolute values, depending on the attachment means on which the first end of this elastic return device is fixed.

According to the invention, a cavity is formed in the drive arm, the attachment means for the first end of the elastic return device extending in this cavity. According to one particular configuration of the present invention, the cavity extends over an entire longitudinal dimension of the drive arm. According to one feature of the present invention, the cavity is delimited by at least one first flank and at least one second flank, the attachment means being arranged between this first flank and this second flank, along a direction transverse to the longitudinal direction, to the first flank and to the second flank. In other words, at least one of the attachment means for the first end of the elastic return device is arranged between the other two.

Advantageously, the attachment means for the first end of the elastic return device can be offset relative to one another along a vertical direction perpendicular, or substantially perpendicular, to the longitudinal direction. In other words, it will be understood that, according to the present invention, these attachment means for the first end of the elastic return device are offset relative to one another along the longitudinal direction and/or along the vertical direction. Advantageously, this makes it possible to vary, along another direction, a distance of the line of action of the elastic return device with respect to a center of rotation, that is to say with respect to a region of connection between the drive arm and a fixing member intended to connect this drive arm to a motor shaft of the vehicle. It will be understood that it is thus possible to vary the force generated at the end of the drive arm that makes it possible to press the wiper blade against the glazed surface of the vehicle along this other direction.

According to the invention, the first end of the elastic return device takes the form of a rounded hook, and at least one attachment means comprises at least one receiving region for the first end of the elastic return device, this receiving region having a shape complementary to the shape of the rounded hook which the first end of the elastic return device takes, with the result that this end can be maintained on the attachment means concerned. Advantageously, all the attachment means have an identical configuration, that is to say that each attachment means then has a receiving region for the first end of the elastic return device, this receiving region having a shape complementary to the shape of the first end of the elastic return device. For example, at least one receiving region of one of the attachment means, advantageously each receiving region of each attachment means, takes the form of a circular cylinder portion that forms a bearing surface configured to receive the hook of the elastic return device. It will be understood that the receiving regions of the attachment means can take any other shape compatible with the shape of the hook that the first end of the elastic return device takes without departing from the context of the present invention, provided that this shape of the receiving regions makes it possible to maintain the first end of the elastic return device on the attachment means concerned.

According to one feature of the present invention, two immediately adjacent attachment means are separated by at least one wall. As mentioned above, at least one of the attachment means is located between the other two. It will then be understood that this attachment means located between the other two is bordered, on either side, by two walls. Advantageously, these walls can delimit, at least in part, the receiving regions of the attachment means intended to receive the first end of the elastic return device. According to an alternative embodiment of the present invention, the attachment means may be devoid of walls.

According to one exemplary embodiment of the present invention, the longest attachment means is located between the other two attachment means, along the direction transverse to the longitudinal direction. The term "longest attachment means" is understood to mean the attachment means which has a longitudinal dimension greater than the longitudinal dimensions of the other two attachment means, in other words a direction measured parallel to the longitudinal direction. In other words, the fastening means located in the middle of the other two extends beyond them, along the longitudinal direction. For example, the transverse direction can be perpendicular, or substantially perpendicular, to the longitudinal direction. It will be understood that this is only one exemplary embodiment and that the attachment means could be arranged otherwise, for example the attachment means having the smallest longitudinal dimension could be positioned between the other two without departing from the context of the present invention.

According to one feature of the present invention, the drive arm comprises a region for connecting to a fixing member, this fixing member being configured to fix the drive arm on a motor shaft. In other words, this fixing member allows mechanical coupling between the drive arm and the motor shaft.

For example, the drive arm may comprise a poka-yoke configured to ensure optimal positioning of the elastic return device, this poka-yoke being arranged between the region for connecting the drive arm to the fixing member and the attachment means for the first end of the elastic return device. This poka-yoke can for example take the form of a bar extending parallel to the transverse direction, between the first flank and the second flank which delimit, at least partially, the cavity formed in the drive arm. According to the invention, this poky-yoke is positioned close to the attachment means, that is to say that a distance measured parallel to the longitudinal direction between the connection region and the poka-yoke is greater than a distance measured parallel to the longitudinal direction between the poka-yoke and any one of the attachment means. Advantageously, this bar forms a stop for the hook forming the first end of the elastic return device, with the result that this elastic return device can be mounted only in one direction, in this instance the direction in which it allows the wiper blade to be pressed against the glazed surface.

According to one example of application of the present invention, the region for connecting the drive arm to the fixing member comprises a bow which delimits a housing intended to receive the fixing member. According to another example of application of the present invention, the region for connecting the drive arm to the fixing member comprises at least one part of a pivot connection, the other part of this pivot connection being formed on the fixing member.

Advantageously, the drive arm can comprise at least one element for centering the attachment means for the first end of the elastic return device, this centering element being arranged between these attachment means and each of the flanks participating in delimiting the cavity formed in the drive arm. The term "centering element" is understood to mean an element configured to maintain in position, in the cavity, the attachment means for the second end of the elastic return device. For example, this centering element comprises at least two apertured blocks respectively arranged between one of the attachment means for the first end of the elastic return device and one of the flanks participating in delimiting the cavity.

Advantageously, at least one attachment means for the first end of the elastic return device can be formed integrally with the drive arm according to the invention. More advantageously still, all the attachment means for the first end of the elastic return device can be formed integrally with the drive arm. The term "formed integrally" is understood to mean the fact that this or these attachment means and the drive arm form a one-piece assembly, that is to say an assembly which cannot be separated without causing damage to the drive arm or to this or these attachment means. Alternatively, the drive arm and the attachment means for the first end of the elastic return device are manufactured independently and then assembled together.

The present invention also relates to a wiper system for a motor vehicle, comprising at least one wiper blade carrying at least one wiper rubber configured to come into contact with a glazed surface of the motor vehicle, and at least one drive arm according to the invention, the drive arm being configured to drive the wiper blade in rotation.

According to the invention, the drive arm comprises the region for connecting the drive arm to the fixing member, this fixing member being configured to fix the drive arm on a motor shaft, this motor shaft being configured. to drive the drive arm in rotation, the wiper system comprising at least one elastic return device, the first end of which is fixed on one of the attachment means formed on the drive arm and a second end of which is fixed on the fixing member. It will be understood that the fixing member comprises a mechanical coupling device configured to mechanically connect the motor shaft to the drive arm. As previously mentioned, the elastic return device of the wiper system according to the invention is configured to exert an elastic return force on the wiper blade so as to press the latter, and more precisely the wiper rubber carried by it, against the glazed surface concerned.

According to one particular configuration of the present invention, the attachment means for the first end of the elastic return device can be arranged on the fixing member, the first end of the elastic return device then being fixed in the cavity of the drive arm and the second end of this elastic return device being positioned on one of the attachment means.

Other features, details and advantages will become more clearly apparent on reading the detailed description given below by way of indication in relation to the various exemplary embodiments illustrated in the following figures.

In the description which will follow, the longitudinal or transverse designations refer to the orientation of a drive arm integrated into a motor vehicle. A longitudinal direction X corresponds to a direction of longitudinal extent of the drive arm, this longitudinal direction being parallel to a longitudinal axis L of a three-dimensional reference system L, V, T shown for example in FIG. 1. A transverse direction Y corresponds to a direction parallel to a transverse axis T of this three-dimensional reference system L, V, T, the transverse axis T being perpendicular to the longitudinal axis L. A vertical direction Z corresponds to a direction parallel to a vertical axis V of the three-dimensional reference system L, V, T, the vertical axis V being perpendicular to the longitudinal axis L and to the transverse axis T. The terms "upper" and "lower" refer to positions along the vertical axis V and the terms "front" and "rear" to positions along the longitudinal axis L.

Figure 1:
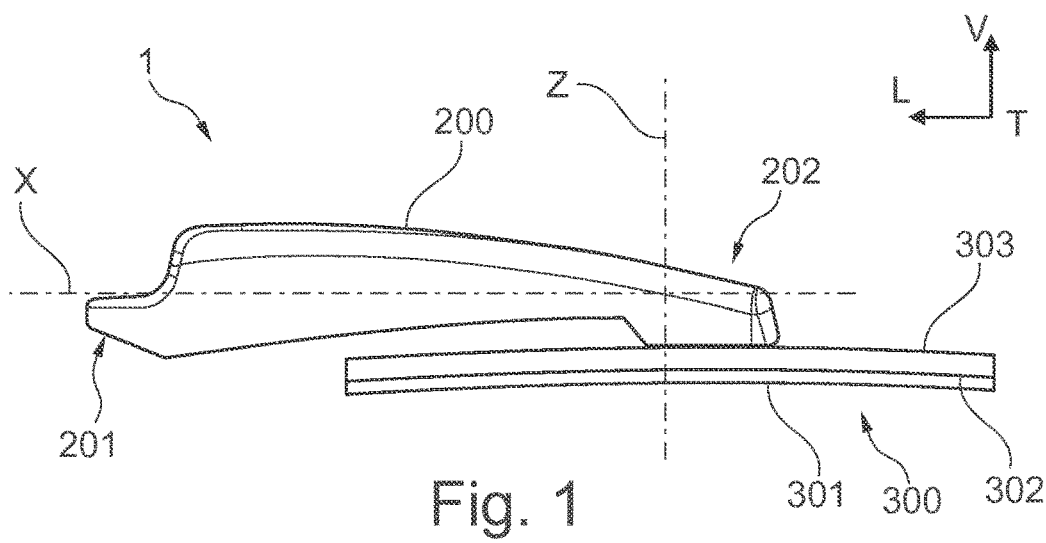
FIG. 1 illustrates a wiper system comprising at least one drive arm according to the invention and a wiper blade.

FIG. 1 illustrates a wiper system 1 according to the invention which comprises a drive arm 200 connected to a wiper blade 300 itself carrying at least one wiper rubber 301 intended to come into contact with a glazed surface of a motor vehicle, for example a rear window of this vehicle. The drive arm 200 comprises a first longitudinal end 201 at which it is connected to a fixing member configured to provide mechanical coupling between the drive arm 200 and a motor shaft, this motor shaft being configured to drive the drive arm 200 in rotation, and a second longitudinal end 202 at which it is connected to the wiper blade 300. It will be understood that the motor shaft is configured, by virtue of the fixing member, to drive the drive arm 200 in rotation and thus allow the sweeping of the glazed surface to be cleaned or wiped. The fixing member is for example illustrated schematically in FIG. 2.

According to one exemplary embodiment illustrated in FIG. 1, the wiper blade 300 extends parallel to the longitudinal direction X and for its part comprises the wiper rubber 301 which forms the portion of this wiper blade 300 intended for come into contact with the glazed surface so as to remove water and/or dirt present on this glazed surface. The wiper blade 300 also comprises at least one bending member 302 configured to generate a curvature of the wiper blade 300 so that the latter follows as closely as possible a curvature of the glazed surface concerned. Such a wiper blade 300 may further comprise an air deflector 303 configured to convert a pressure applied by a flow of air circulating along the glazed surface into a bearing force for pressing this wiper blade 300 against this glazed surface. The wiper blade 300 is connected to the drive arm 300, and more particularly to the second longitudinal end 202 of this drive arm 300, by a connection device arranged substantially in its middle.

According to one exemplary embodiment, the wiper blade 300 further comprises a support carrying the wiper rubber 301, the bending member 302 and the air deflector 303. Alternatively, provision may be made for the wiper rubber to be fixed, for example by adhesive bonding, to the air deflector, for the air deflector and the wiper rubber to be in one piece, that is to say that they form a single unit which cannot be separated without causing damage to the air deflector or the wiper blade, or even for the wiper blade to comprise two bending members. It will be understood that the embodiments described here are given only by way of example and that the drive arm according to the invention could be adapted to other types of wiper blades without departing from the context of invention.

In order to ensure optimum wiping of the glazed surface, the wiper blade 301 must scrape this glazed surface. In order to ensure contact between the wiper rubber 301 and the glazed surface, the drive arm 200 houses an elastic return device—for example partially illustrated in FIG. 4—configured to exert an elastic return force on the drive arm 200 so as to press the wiper rubber 301 against the glazed surface concerned. Advantageously, the bending member mentioned above makes it possible to uniformly distribute this elastic return force exerted by the elastic return device over an entire longitudinal dimension, that is to say a dimension measured parallel to the longitudinal direction X, of the wiper blade 300. Thus, the entire wiper rubber 301 is in contact with this glazed surface.

Figure 2:
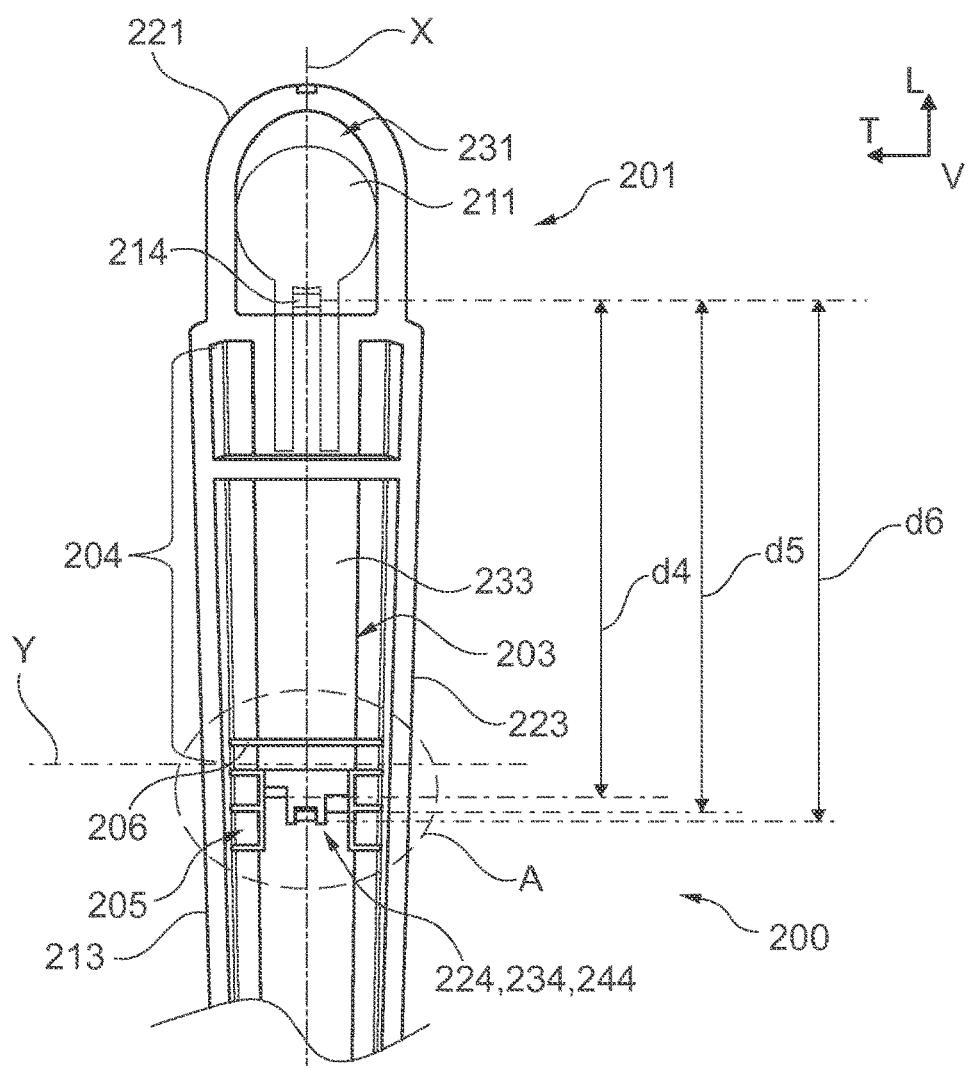
FIG. 2 shows, seen from below, a portion of the drive arm according to the invention, on which is schematically shown a member for fixing the drive arm on a motor shaft.

As illustrated for example in FIG. 2, the drive arm 200 thus comprises a cavity 203 of which at least one portion 204 is able to receive the elastic return device mentioned above. This FIG. 2 shows the drive arm 200 according to the invention seen from below and thus makes this cavity 203 particularly visible. This cavity 203 thus extends over an entire longitudinal dimension of the drive arm 200 and it is delimited by at least one first flank 213, one second flank 223 and by a bottom wall 233 connecting the first flank 213 to the second flank 223. This FIG. 2 also illustrates, schematically, the fixing member 211 intended to connect the drive arm 200 to the motor shaft. The drive arm 200 thus comprises a region for connecting to the fixing member 211. According to the example illustrated here, this connection region is formed by the first longitudinal end 201 of this drive arm 200, which takes the form of a bow 221 which delimits a housing 231 in which this fixing member 211 is received.

Figure 4:
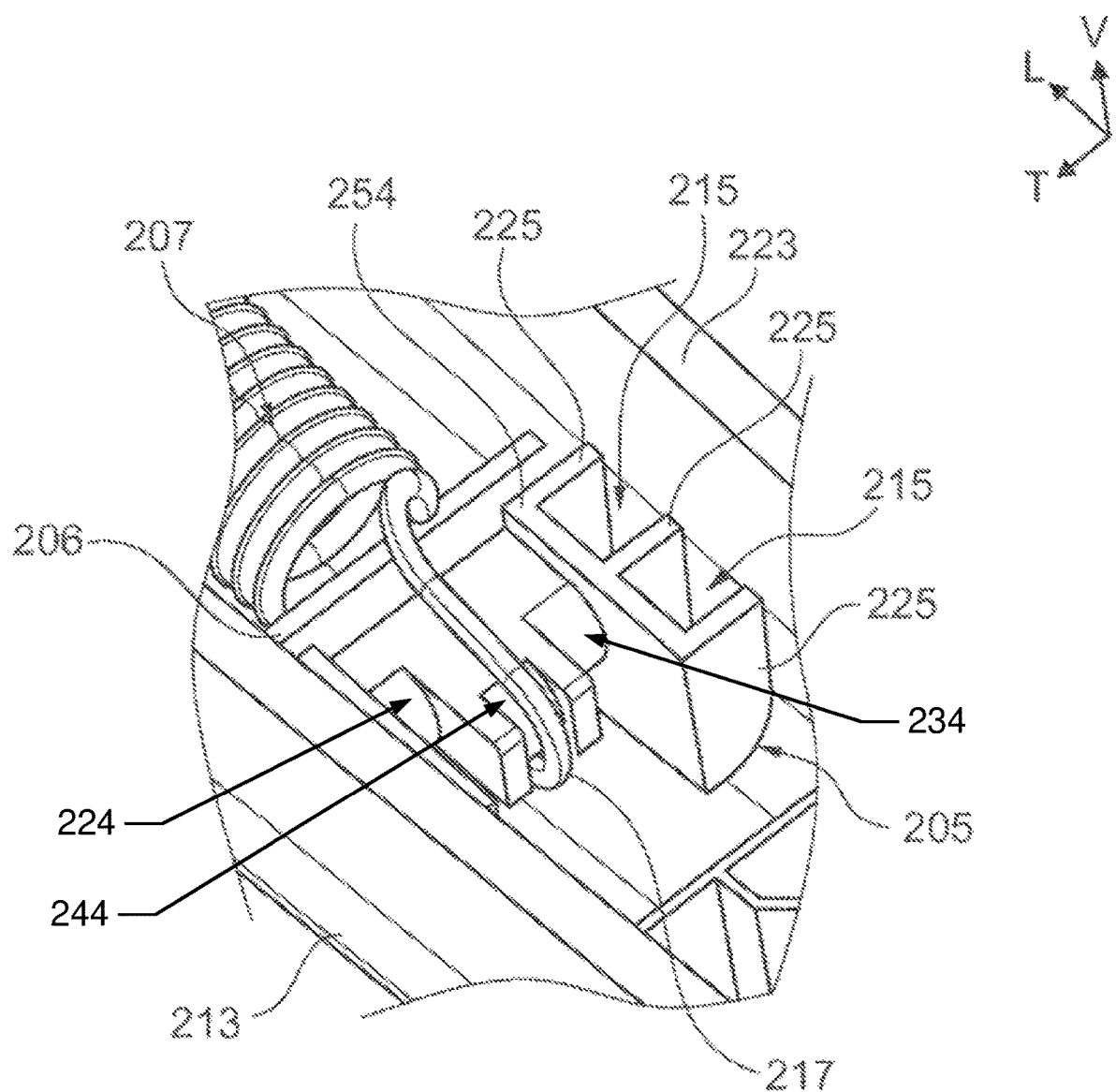
FIG. 4 is a perspective view of the region of the drive arm illustrated in FIG. 3 in which the elastic return device is positioned on one of the attachment means illustrated in FIG. 3.

The portion 204 of the cavity 203 capable of receiving the elastic return device is for its part delimited on the one hand by the bow 221 forming the first longitudinal end 201 of the drive arm 200 and on the other hand by attachment means 224, 234, 244 for a first end—for example visible in FIG. 4—of the elastic return device. For example, the attachment means 224, 234, 244 for the first end of the elastic return device can be formed integrally with the drive arm 200. In other words, this drive arm 200 and these attachment means 224, 234, 244 form a one-piece assembly, that is to say an assembly which cannot be separated without causing damage to the drive arm 200 or to at least one of the attachment means 224, 234, 244. For example, the drive arm 200 and these attachment means 224, 234, 244 can be co-molded. The fixing member 211 configured to ensure the mechanical coupling of the drive arm 200 to the motor shaft also comprises a fixing means 214 for a second end—not illustrated here—of this elastic return device.

According to one exemplary embodiment not illustrated here, provision may be made for the drive arm to be devoid of a bow and for the fixing member to be connected to this drive arm by a pivot connection. In other words, according to this exemplary embodiment, the region for connecting the drive arm to the fixing member is formed by at least one part of this pivot connection.

According to the example illustrated here, the drive arm 200 comprises three one-piece attachment means 224, 234, 244, that is to say that these three attachment means 224, 234, 244 form an assembly which cannot be separated without occasioning damage to one of them. It will be understood that this is only one exemplary embodiment of the present invention and that this drive arm 200 could comprise two attachment means or more than three attachment means for the first end of this elastic return device without departing from the context of the present invention.

Whatever the number of attachment means formed in the cavity of the drive arm, they are all located at non-zero distances from one other along the longitudinal direction X. Thus, a first distance d1 measured between a first attachment means 224 and second attachment means 234, a second distance d2 measured between the first attachment means 224 and a third attachment means 244 and a third distance d3 measured between the second attachment means 234 and the third attachment means 244 are all three non-zero, these three distances d1, d2, d3 being measured parallel to the longitudinal direction X. These first, second and third distances d1, d2, d3 are for example shown in FIG. 3. It will then be understood that these attachment means 224, 234, 244 are located at different longitudinal distances from the fixing means 214 for the second end of the elastic return device. The term "longitudinal distances" is understood to mean distances measured parallel to the longitudinal direction X. In other words, a fourth distance d4 measured between the fixing means 214 and the first attachment means is different from a fifth distance d5 measured between the fixing means 214 and the second attachment means and that these fourth and fifth distances are also different from a sixth distance d6 measured between the fixing means 214 and the third attachment means 244.

It will then understood that, depending on the attachment means 224, 234, 244 on which the first longitudinal end of the elastic return device is fixed, the latter is elongated to a greater or lesser extent. By definition, this elastic return device tends, when stretched, to assume an initial position, also called the rest position. As a result, the elastic return force exerted by this elastic return device is greater or lower depending on the elongation to which it is subjected, that is to say depending on the attachment means 224, 234, 244 on which the first end of this elastic return device is fixed. Thus, the greater the elongation of this elastic return device, the greater the elastic return force that it exerts. Conversely, the lower the elongation of this elastic return device, the lower the elastic return force that it exerts.

Figure 3:
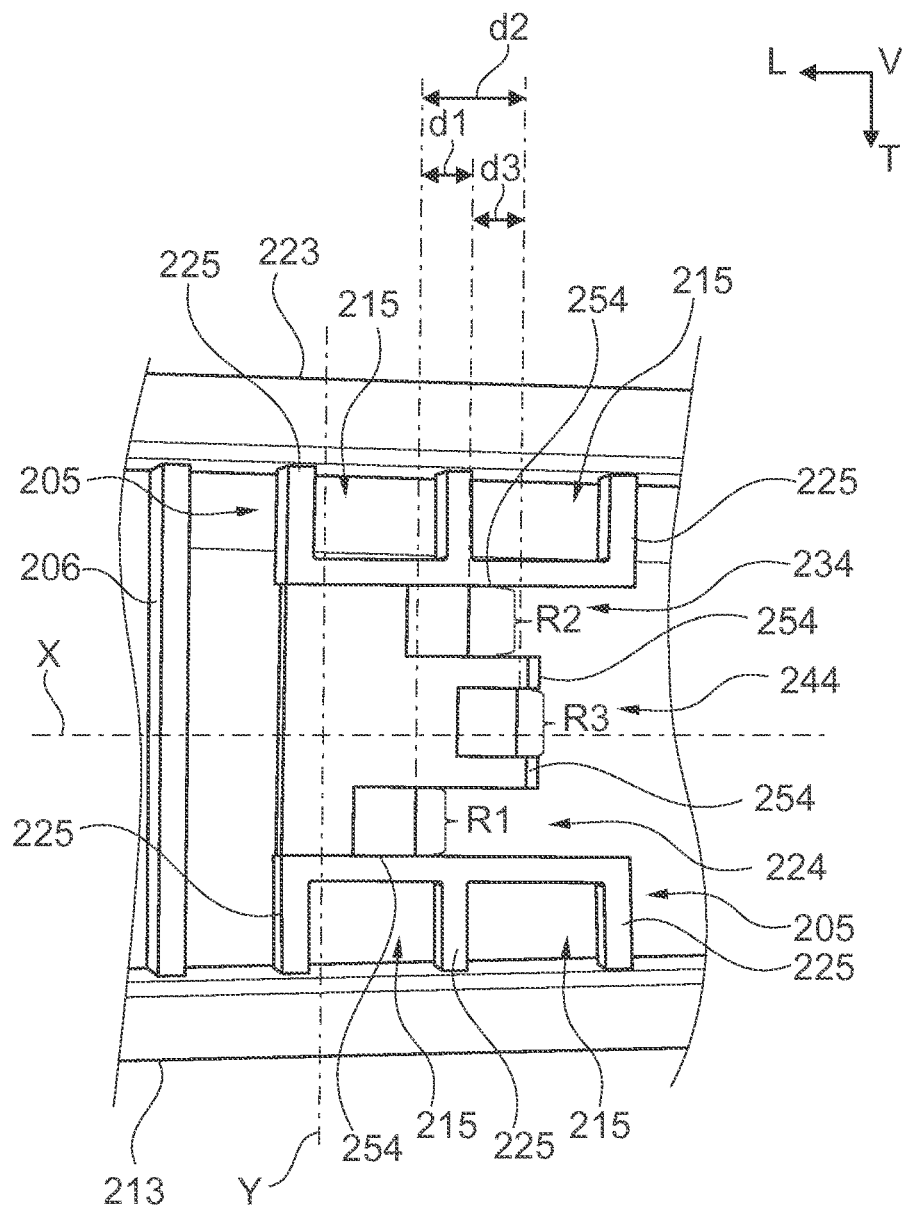
FIG. 3 is an enlargement of a region of the drive arm at which are arranged attachment means for an elastic return device.

According to an example illustrated in FIGS. 2 to 4, the fourth distance d4 is less than the fifth distance d5, which is itself less than the sixth distance d6. In other words, when the first end of the elastic return device is fixed on the first attachment means 224, the elastic return force which it exerts on the drive arm 200 is lower than when this first end of the elastic return device is fixed on the second attachment means 234 or on the third attachment means 244. It is also noted that the first attachment means 224, the third attachment means 244 and the second attachment means 234 are arranged in this order, along the transverse direction Y, between the first flank 213 and the second flank 223. In other words, the third attachment means 244 is, still according to the example illustrated here, sandwiched between the first attachment means 224 and the second attachment means 234. Advantageously, the longest attachment means, that is to say the attachment means on which the greatest elastic return force is exerted, is thus arranged in the middle of the other two.

It will be understood that this is only one exemplary embodiment and that the ratios of the distances d4, d5, d6 relative to one another, as well as the order in which the attachment means 224, 234, 244 are arranged, could be modified without departing from the context of the present invention. It will therefore be understood that the drive arm according to the invention is suitable for use on different types of vehicle, without the efficiency of the cleaning of the glazed surface concerned being impaired.

As shown in FIG. 2, it is noted that these attachment means 224, 234, 244 extend only over a transverse portion of the cavity 203. Thus, it is noted that these attachment means 224, 234, 244 are bordered laterally, that is to say along the transverse direction Y, by a centering element 205. According to the example illustrated here, this centering element 205 comprises two apertured blocks, each of these apertured blocks being arranged between the attachment means 224, 234, 244 and one of the flanks 213, 223 delimiting the cavity 203. This centering element 205 advantageously makes it possible to ensure the transverse position, that is to say the position along the transverse direction Y of these attachment means 224, 234, 244. According to the example illustrated here, this centering element 205 is formed integrally with the drive arm 200 and with the attachment means 224, 234, 244 for the first end of the elastic return device. This centering element 205 will be described more fully below.

Note also the presence of a poka-yoke 206 arranged between the fixing point 214 for the second longitudinal end of the elastic return device and the attachment means 224, 234, 244, in the vicinity of these attachment means 224, 234, 244. The term "in the vicinity of the attachment means 224, 234, 244" is understood to mean the fact that a distance measured parallel to the longitudinal direction X between the poka-yoke 206 and any of these attachment means 224, 234, 244 is less than a distance measured parallel to the longitudinal direction X between the poka-yoke 206 and the fixing point 214 for the second end of the elastic return device. For example, this poka-yoke 206 can also be co-molded with the drive arm 200 and the attachment means 224, 234, 244, that is to say that the one-piece assembly as described above then consists of the drive arm 200, the poka-yoke 206 and the attachment means 224, 234, 244. This poka-yoke 206 makes it possible to ensure the correct positioning of this elastic return device and will be described more fully below with reference to FIGS. 3 and 4.

Referring to FIGS. 3 and 4, we will now describe in more detail the three attachment means 224, 234, 244 for the second end of the elastic return device that are formed in the cavity. These FIGS. 3 and 4 are enlargements of a region A as indicated in FIG. 2, FIG. 3 being a top view of this region A and FIG. 4 being a perspective view of this region A. FIG. 4 also illustrates the elastic return device 207 positioned on the third attachment means 244.

As previously described, the attachment means 224, 234, 244 are offset relative to one another along the longitudinal direction X. FIG. 3 thus illustrates the first, second and third distances d1, d2, d3 measured between these attachment means 224, 234, 244 and described above. The fixing means for the second end of the elastic return device 207 being fixed, it will be understood that it is this longitudinal offset of the attachment means 224, 234, 244 for the first end 217 of the elastic return device 207 that makes it possible to vary the elongation of this elastic return device 207, and therefore to vary the elastic return force which it exerts. As shown for example in FIG. 4, at least the first end of the elastic return device takes the form of a rounded hook. According to an alternative embodiment not illustrated here, the attachment means can also be offset relative to one another along a vertical direction Z, this vertical direction Z being shown for example in FIG. 1. Advantageously, this makes it possible to vary, along another direction, a distance of the line of action of the elastic return device with respect to a center of rotation, that is to say with respect to the region of connection between the drive arm and the fixing member intended to connect this drive arm to the motor shaft of the vehicle. In other words, this offset along the vertical direction Z makes it possible to vary the force that makes it possible to press the wiper blade against the glazed surface of the vehicle. It will thus be understood that the attachment means can thus be offset relative to one another along the longitudinal direction and/or along the vertical direction.

Each attachment means 224, 234, 244 comprises a receiving region R1, R2, R3 for the first end 217 of the elastic return device 207, each receiving region R1, R2, R3 being delimited transversely by at least two walls 254 which extend beyond this receiving region, along the longitudinal direction X. It will be understood that these walls 254 make it possible to maintain the first end 217 of the elastic return device 207 in position in the receiving region R1, R2, R3 concerned and thus prevent this first end 217 from sliding toward one or the other of the other attachment means 224, 234, 244, which would modify the elongation to which the elastic return device 207 is subjected, and therefore the elastic return force applied by this elastic return device 207 to the drive arm.

The first, second and third distances d1, d2, d3 described above and illustrated in FIG. 3 correspond to distances measured between the receiving regions R1, R2, R3 of these attachment means 224, 234, 244.

According to the example illustrated here, it is noted that the walls 254 which delimit the receiving region R3 of the third attachment means 244 also participate in delimiting the receiving regions R1, R2 of the first and second attachment means 224, 234. Thus, the receiving region R1 of the first attachment means 224 is delimited transversely by two walls 254, one of which delimits the receiving region R3 of the third attachment means 244 and the other of which is formed by a portion of the centering element 205 mentioned above. Analogously, the receiving region R2 of the second attachment means 234 is delimited transversely by two walls 254, one of which partially delimits the receiving region R3 of the third attachment means 244 and the other of which is formed by a portion of the centering element 205 mentioned above.

According to the example illustrated here, each of the receiving regions R1, R2, R3 of each of the attachment means 224, 234, 244 takes the form of a circular cylinder portion delimited on either side by the walls 254 and capable of receiving the first end 217 of the elastic return device, and more particularly the rounded hook forming this first end 217 of the elastic return device 207. In other words, this circular cylinder portion forms a bearing surface of complementary shape to the shape of the first end of the elastic return device such that this end is maintained on the attachment means concerned, and more particularly in the receiving region of the attachment means concerned. It will be understood that this is only one exemplary embodiment of the present invention and that the receiving regions could take any other shape compatible with the shape of the first end of the elastic return device without departing from the context of the present invention.

As previously described, the centering element 205 comprises two apertured blocks respectively arranged between the first attachment means 224 and the first flank 213 and between the second attachment means 234 and the second flank 223. Advantageously, these apertured blocks are symmetrical with respect to a longitudinal and vertical plane, that is to say a plane in which the longitudinal axis L and the vertical axis V are inscribed, so that the references made to one of these apertured blocks can be directly transposed to the other of these apertured blocks. According to the example illustrated here, each apertured block comprises two apertures 215 such that three branches 225 extend from one of the walls 254 participating in delimiting the receiving regions R1, R2 of the first or of the second attachment means 224, 234 up to one of the flanks 213, 223 which delimit the cavity, it being understood that the walls 254 participating in delimiting the receiving regions of the first and second attachment means are formed by a portion of this apertured block. In other words, each apertured block takes the form of an E seen in a section taken on a plane in which the longitudinal axis L and the transverse axis T are inscribed. Advantageously, these apertures 215 make it possible to avoid unnecessarily weighing down the drive arm according to the invention and to limit the sink marks that may appear during the manufacture of such a drive arm. Advantageously, these branches 225 also make it possible to avoid poor positioning of the first end of the elastic return device, that is to say that they make it possible to prevent this first end of the elastic return device from being positioned between one of the walls 224, 234 participating in forming the centering element 205 and the flanks 213, 223. It is also noted that these apertured blocks extend beyond the attachment means 224, 234, 244, both along the longitudinal axis L and along the vertical axis V.

FIGS. 3 and 4 also make the poka-yoke 206 mentioned above particularly visible. The latter thus takes the form of a bar which extends predominantly along the transverse direction Y, between the first flank 213 and the second flank 223 which delimit the cavity. In other words, this bar is perpendicular, or substantially perpendicular, to the first flank 213 and to the second flank 223. As particularly visible in FIG. 4, this poky-yoke 206 makes it possible to ensure the correct positioning of the elastic return device 207 by forming a stop fir the latter. Thus, if the elastic return device 207 is mounted the wrong way around, it is impossible to hook it to one or other of the receiving regions R1, R2, R3 of the first, second or third attachment means 224, 234, 244.

According to one exemplary embodiment of the present invention not illustrated here, provision may be made for the attachment means to be formed on the fixing member that makes it possible to connect the drive arm to the motor shaft. In other words, according to this exemplary embodiment, the first end of the elastic return device is then fixed in the cavity of the drive arm and the second end of this elastic return device is for its part arranged on one of these attachment means. Thus, the variation in the elongation of the elastic return device, and therefore in the force which it exerts on the drive arm, depends on the attachment means on which this second end of the elastic return device is fixed.

The present invention thus proposes a simple and inexpensive means for standardizing, at least in part, the wiper blade drive arms intended for motor vehicle wiper systems. It will be understood that, by virtue of the present invention, one and the same drive arm can be arranged on different vehicle models, with the result that the manufacturing costs of such drive arms are reduced.

The present invention should not, however, be limited to the means and configurations described and illustrated in the present document and also encompasses any equivalent means and configuration and any technically operative combination of such means. In particular, the shape and the arrangement of the attachment means for the second end of the elastic return device can be modified without harming the invention insofar as they perform the functions which have just been described.

The invention claimed is:

1. A drive arm for driving a wiper blade for a motor vehicle, the drive arm extending along a longitudinal direction and comprising:
   at least one first attachment slot for a first end of an elastic return device;
   at least one second attachment slot for the first end of the elastic return device; and
   at least one third attachment slot for the first end of the elastic return device,
   wherein a first distance measured parallel to the longitudinal direction between the first attachment slot and the second attachment slot is non-zero,
   wherein a second distance measured between the first attachment slot and the third attachment slot being non-zero and a third distance measured between the second attachment slot and the third attachment slot being non-zero,
   wherein the third attachment slot is the longest, and is located between the first and second attachment slots along a direction transverse to the longitudinal direction, and
   wherein the first attachment slot, the second attachment slot, and the third attachment slot are offset relative to one another along the longitudinal direction.

2. The drive arm as claimed in claim 1, wherein a cavity is formed in the drive arm and wherein the attachment slots for the first end of the elastic return device extend in this cavity.

3. The drive arm as claimed in claim 2, wherein the attachment slots for the first end of the elastic return device are offset relative to one another along a vertical direction substantially perpendicular to the longitudinal direction.

4. The drive arm as claimed in claim 1, wherein the first end of the elastic return device takes the form of a rounded hook, and wherein at least one attachment slots comprises at least one receiving region for the first end of the elastic return device, this receiving region taking the form of a circular cylinder portion.

5. The drive arm as claimed in claim 1, wherein two immediately adjacent attachment slots are separated by at least one wall.

6. The drive arm as claimed in claim 1, comprising a region for connecting to a fixing member, the fixing member being configured to fix the drive arm on a motor shaft.

7. A wiper system for a motor vehicle, comprising:
   at least one wiper blade carrying at least one wiper rubber configured to come into contact with a glazed surface of the motor vehicle; and
   at least one drive arm, the drive arm being configured to drive the wiper blade in rotation and extending along a longitudinal direction, the drive arm comprising:
   at least one first attachment slot for a first end of an elastic return device;
   at least one second attachment slot for the first end of the elastic return device; and
   at least one third attachment slot for the first end of the elastic return device,
   wherein a first distance measured parallel to the longitudinal direction between the first attachment slot and the second attachment slot is non-zero,
   wherein a second distance measured between the first attachment slot and the third attachment slot being non-zero and a third distance measured between the second attachment slot and the third attachment slot being non-zero,
   wherein the third attachment slot is the longest, and is located between the first and second attachment slots along a direction transverse to the longitudinal direction, and
   wherein the first attachment slot, the second attachment slot, and the third attachment slot are offset relative to one another along the longitudinal direction.

8. The wiper system as claimed in claim 7, the drive arm further comprising: a region for connecting the drive arm to a fixing member, this fixing member being configured to fix the drive arm on a motor shaft, the motor shaft being configured to drive the drive arm in rotation,
   the wiper system further comprising: at least one elastic return device, a first end of which is fixed on one of the attachment slots formed in the drive arm and a second end of which is fixed on the fixing member.

* * * * *